(12) United States Patent
Akhtman et al.

(10) Patent No.: US 11,092,489 B2
(45) Date of Patent: Aug. 17, 2021

(54) WIDE-ANGLE COMPUTATIONAL IMAGING SPECTROSCOPY METHOD AND APPARATUS

(71) Applicant: GAMAYA SA, Morges (CH)

(72) Inventors: Yosef Akhtman, St-Prex (CH); Christophe Galland, Lausanne (CH)

(73) Assignee: GAMAYA SA, Morges (CH)

( * ) Notice: Subject to any disclaimer, the term of this patent is extended or adjusted under 35 U.S.C. 154(b) by 0 days.

(21) Appl. No.: 16/483,048

(22) PCT Filed: Jan. 31, 2018

(86) PCT No.: PCT/IB2018/050595
§ 371 (c)(1),
(2) Date: Aug. 2, 2019

(87) PCT Pub. No.: WO2018/142295
PCT Pub. Date: Aug. 9, 2018

(65) Prior Publication Data
US 2020/0348175 A1 Nov. 5, 2020

(30) Foreign Application Priority Data
Feb. 3, 2017 (WO) .................. PCT/IB2017/050597

(51) Int. Cl.
*G01J 3/26* (2006.01)
*G01J 3/28* (2006.01)
*G01J 3/02* (2006.01)

(52) U.S. Cl.
CPC ........... *G01J 3/2823* (2013.01); *G01J 3/0208* (2013.01); *G01J 3/0256* (2013.01); *G01J 3/2803* (2013.01); *G01J 2003/2806* (2013.01)

(58) Field of Classification Search
CPC ........ G01J 3/28; G01J 3/02; G01J 3/26; G01J 3/36; G02B 13/0045; G02B 13/0015; G02B 13/146; B82Y 20/00
See application file for complete search history.

(56) References Cited

U.S. PATENT DOCUMENTS

| 6,552,788 B1 | 4/2003 | Castle |
| 7,196,855 B2 | 3/2007 | Yamaguchi |

(Continued)

FOREIGN PATENT DOCUMENTS

| WO | 2013/116316 A1 | 8/2013 |
| WO | 2016/012980 A1 | 1/2016 |

OTHER PUBLICATIONS

Written Opinion of the International Searching Authority dated May 23, 2018, issued in International Application No. PCT/IB2018/050595, 6 pages.

(Continued)

*Primary Examiner* — Abdullahi Nur
(74) *Attorney, Agent, or Firm* — Nixon & Vanderhye P.C.

(57) ABSTRACT

A system for computational imaging spectroscopy to provide compact and lightweight design, as well as large field of view of an object to be captured. The system includes imaging components, and computational device. The imaging components includes lens assembly, a fixed or variable-diameter aperture, spectral filter array and imaging sensor. The lens assembly provides wide angle of view, image-side telecentricity, and further may correct for longitudinal chromatic aberrations. The lens assembly may not provide correction of lateral chromatic aberrations. Furthermore, the lens assembly provides image-space telecentricity so as to chief rays are incident perpendicular to image sensor. The lens assembly may produce different chromatic aberrations pattern for each wavelength within the spectral range of interest. The pass-band nanofilter array is configured to filter (Continued)

a plurality of specific bands of light reflected from the imaged object and further produces a plurality of spatio-spectral samples of the imaged object projected onto the photosensitive pixels of imaging sensor. The computational device reconstructs complete spectral cube within the spectral range of interest, and further enables the computation of object reflectance at each pixel of the captured image from the plurality of spatio-spectral samples registered by the imaging sensor.

9 Claims, 5 Drawing Sheets

(56) References Cited

U.S. PATENT DOCUMENTS

| | | | |
|---|---|---|---|
| 7,242,478 | B1 | 7/2007 | Dombrowski et al. |
| 8,563,913 | B2 | 10/2013 | Dowski, Jr. et al. |
| 8,654,328 | B2 | 2/2014 | Thomasz |
| 9,418,193 | B2 | 8/2016 | Dowski, Jr. et al. |
| 2009/0002835 | A1 | 1/2009 | Prior et al. |
| 2009/0326383 | A1 | 12/2009 | Barnes et al. |
| 2010/0201782 | A1 | 8/2010 | Yamada et al. |
| 2014/0185134 | A1 | 7/2014 | Kamitakahara et al. |
| 2014/0204477 | A1 | 7/2014 | Asami et al. |
| 2014/0293062 | A1 | 10/2014 | Høye et al. |
| 2015/0177429 | A1 | 6/2015 | Darty |
| 2016/0037141 | A1 | 2/2016 | Matsushita |
| 2016/0065938 | A1* | 3/2016 | Kazemzadeh ....... H04N 13/232 348/46 |
| 2016/0313181 | A1* | 10/2016 | Golub ................... G01J 3/027 |

OTHER PUBLICATIONS

International Search Report for PCT/IB2018/050595 dated May 23, 2018, 3 pages.

Najiminaini et al., "Nanohole-array-based device for 2D snapshot multispectral imaging", *Scientific Reports*, vol. 3, Sep. 5, 2013.

Mohamadreza Najiminaini et al., "Nanohole-Array-Based Device for 2D SnapShot Multispectral Imaging," Scientific Reports, Sep. 5, 2013, 7 pages.

* cited by examiner

WIDE-ANGLE COMPUTATIONAL IMAGING SPECTROSCOPY METHOD AND APPARATUS

CROSS REFERENCE TO RELATED APPLICATIONS

The present application is a United States national stage application of International patent application PCT/IB2018/050595 filed on Jan. 31, 2018 designating the United States, and claims foreign priority to International patent application PCT/IB2017/050597 filed on Feb. 3, 2017, the entire contents of each of which are hereby incorporated by reference.

FIELD OF INVENTION

The invention relates to a computational imaging system, more specifically a system for a computational imaging spectroscopy to provide a compact and lightweight design, as well as a wide field of view of the imaged scene.

BACKGROUND OF INVENTION

In prior art, a new generation of compact hyperspectral sensors has been developed, based on the integration of spectral nanofilters directly on a photosensitive pixel array. A number of spectral band-path filter technologies have been utilised for this purpose including Fabry-Perot interferometers and plasmonic filters. As an example, the Fabry-Perot interferometer makes use of multiple reflections between the two closely spaced partially silvered surfaces. Part of the light is transmitted each time the light reaches the second surface, resulting in multiple offset beams which can interfere with each other. The large number of interfering rays produces an interferometer with extremely high resolution, somewhat like the multiple slits of a diffraction grating increase its resolution.

The aforementioned technology is enabling a growing number of applications of hyperspectral imaging, in particular applications for which low weight and small size are critical. Compact hyperspectral cameras mounted on unmanned drones may be used to monitor vegetation, water and farming fields for remote sensing. Furthermore, the compact design allows for the development of a new class of hyperspectral nano-satellites, which carries the potential to dramatically reduce the cost of production and deployment of such devices.

Notably, the passband central wavelength and the spectral response of a Fabry-Perot, or a plasmonic filter depends on the illumination angle relative to the plane normal to the filter surface. When such a filter is placed in the focal plane of a conventional photographing lens system the above-mentioned angle-dependence results in two effects detrimental to the spectral camera performance. The first is that the passband wavelength shifts toward the red for pixels further away from the axis of the system and the second is that the spectral width of the passband increases with increasing incidence cone angle on the sensor, which leads to a decrease in spectral resolution.

The problem is particularly significant when the lens is designed to capture a wide angle-of-view, because such designs lead to very wide distribution of incidence angles of the light rays on the imaging plane.

In order to counter the aforementioned detrimental effects, telecentric lens designs are often used. Nevertheless, existing telecentric lens systems are designed to correct for all chromatic aberrations, which leads to prohibitively complex, large and heavy assemblies. Hence there is a need of an alternative imaging system design, which is telecentric in image space, so that the chief rays are incident perpendicular to the sensor plane, while enabling wide angle imaging and simultaneously remaining compact in size and relatively lightweight.

Further limitations and disadvantages of conventional and traditional approaches will become apparent to one of skill in the art, through comparison of described systems with some aspects of the present invention, as set forth in the remainder of the present application and with reference to the drawings.

SUMMARY OF INVENTION

The invention provides an imaging system for computational imaging spectroscopy of light reflected from an object to be captured, the imaging system being configured to provide compact and lightweight design, and further provide a large field of view of an object. The system comprises a plurality of imaging components to capture a plurality of rays of light reflected by an imaged object, the plurality of imaging components comprising: a lens assembly configured to provide a wide-angle of view, an image-side telecentricity, such that chief rays are incident perpendicular to an image plane, at the expense of the correction for lateral and longitudinal chromatic aberrations; a spectral nanofilter array; a light sensitive imaging sensor array; and a computational device to reconstruct a spectral cube from data output from the light sensitive imaging sensor array.

In a preferred embodiment, the lens assembly comprises a plurality of elements, among which a plano-concave singlet element, a plano-convex singlet element; a biconcave singlet element; and an aperture stop, whereby the aperture stop is any one from the list comprising a fixed aperture and a variable-diameter aperture.

In a further preferred embodiment, the lens assembly is configured to produce a plurality of distortion patterns for each wavelength within the spectral range of interest, where the spectral nanofilter array is configured to produce a plurality of spatio-spectral samples; and the imaging sensor array is configured to record the plurality of spatio-spectral samples on the data storage device.

In a further preferred embodiment, the computational device further is configured to reconstruct the spectral cube of an imaged scene from a plurality of spatio-spectral samples of an imaged scene recorded by the imaging sensor.

BRIEF DESCRIPTION OF THE DRAWINGS

The accompanying drawings illustrate various embodiments of systems, methods, and other aspects of the invention. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not to limit the scope in any manner, wherein similar designations denote similar elements, and in which.

DETAILED DESCRIPTION OF PREFERRED EMBODIMENTS OF THE INVENTION

Figure 1:
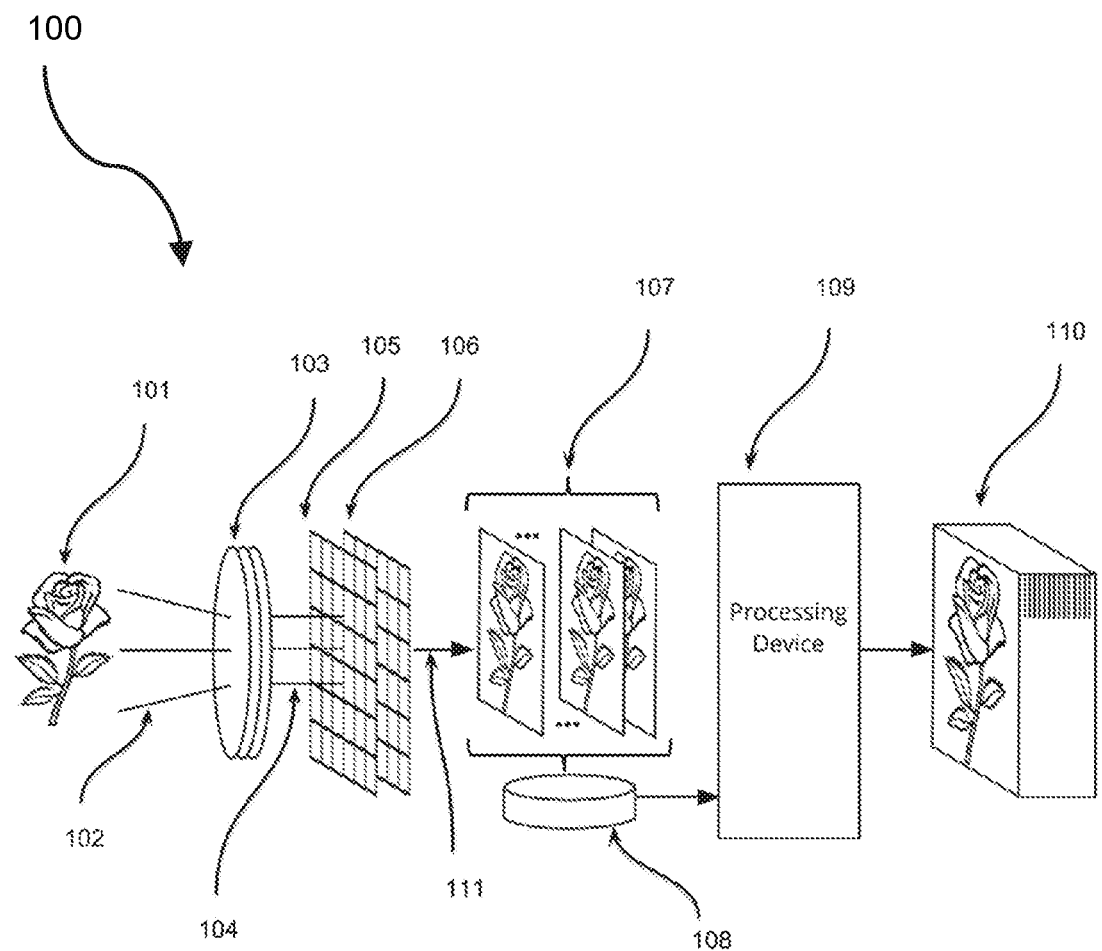
FIG. 1 illustrates a computational hyperspectral imaging system, in accordance with at least one embodiment.

According to embodiments illustrated herein, there may be a system for computational imaging spectroscopy to provide compact and lightweight design, as well as large field of view of an object to be captured. The system includes a plurality of imaging components, as well as a computational device to reconstruct a spectral cube. The plurality of imaging components includes a lens assembly, a fixed, or variable-diameter aperture, a spectral nanofilter array, and a photosensitive pixel array. The photosensitive pixel array may be typically implemented using CCD, or CMOS technology, among other methods. In an example embodiment, the computational device may include a fast data transfer interface with the imaging sensor, temporary data storage buffer, data processing device, as well as removable, or integrated data storage device. Furthermore, the computational device performs the geometric and radiometric reconstruction of the imaged scene from the plurality of the spatio-spectral samples recorder by the individual photosensitive elements of the imaging sensor.

The lens assembly provides a wide-angle image-telecentric capture of the rays of light reflected by the imaged object, and further is optimized for compactness and low weight. In preferred embodiments, the lens may correct for longitudinal, but not the lateral chromatic aberrations. The fixed, or variable-diameter aperture stop disposed between the imaged object to be captured and the doublet lens in the object focal plane to achieve the image-space telecentricity so as to chief rays are incident perpendicular to an image sensor place.

In the disclosed embodiment, a plurality of imaging components, including singlet lenses and fixed, or variable-diameter aperture are arranged in a specific order and configuration from the object side to the image side. The computational device reconstructs a spectral cube from the plurality of spatio-spectral samples recorded by the imaging sensor, and further computes the reflectance.

The present invention may be best understood with reference to the figures and detailed description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

According to embodiments illustrated herein, and more particularly FIG. 1, this shows a computational hyperspectral imaging system 100 comprising a lens assembly 103 configured to provide compact and lightweight design, as well as a large field of view of an object 101 to be captured. A plurality of imaging components comprises the lens assembly 103 with a plurality of lens elements 103, a fixed, or variable-diameter aperture, a spectral nanofilter array 105, and a photosensitive pixel array 106. The photosensitive pixel array 106 may typically be implemented using a charge-coupled device CCD, or complementary metal-oxide-semiconductor (CMOS) technology, among other methods. The computational hyperspectral imaging system 100 further comprises a computational device 109 enabled to provide a reconstruction of the spectral cube 110 of the imaged object 101. In an example embodiment, the computational device 109 may comprise a fast data transfer interface 111 with the imaging pixel array 106, a temporary data storage buffer 108, as well as an internal, or a removable data storage device 110. Furthermore, the computational device 109 performs the geometric and radiometric reconstruction of the imaged object 101 from a plurality of spatio-spectral samples 107 recorder by the individual photosensitive elements of the imaging photosensitive pixel array 106.

The lens assembly 103 provides a wide-angle image-telecentric view of the imaged object 101, and is further optimised for compactness and low weight. More specifically, the lens assembly 103 collects a plurality of rays of light 102 reflected from a plurality of spatial points on a surface of the imaged object 101 and thereby translates them into collimated rays 104 to be projected onto a surface of the spectral nanofilter array 105 and thereafter an imaging plane on the photosensitive pixel array 106. In a preferred embodiment, the lens assembly 103 may correct for longitudinal, but not the lateral chromatic aberrations and further achieve the image-space telecentricity so as to (chief) collimated rays 104 are incident perpendicular to an image plane.

The lens assembly 103 assembly is optimised to correct the longitudinal chromatic aberrations, but not provide correction of lateral chromatic aberrations. The lens assembly 103 may therefore produce different chromatic aberrations pattern for each wavelength within the spectral range of interest thus resulting in a plurality of optically and radiometrically distorted layers 107 of spatio-spectral samples. The lens assembly 103 is explained in detail in conjunction with FIG. 2, albeit the reference 103 is not used in FIG. 2.

The spectral nanofilter array 105 may further constitute a fixed, or tunable pattern of frequency selective filters whereupon each individual filter is capable of transferring a specifically intended part the electromagnetic spectrum, while absorbing other frequencies. Furthermore, the plurality of frequency-selective filters of the spectral nanofilter array 105 may be organised in a gradient, periodic, or aperiodic patterns thus allowing for the generation of various spatio-spectral sampling strategies. The spectral nanofilter array 105 may be implemented using thin-film interferometer nano-fabrication technologies including Fabry-Perot and plasmic filters. The photosensitive pixel array 106 may be typically implemented using CCD, or CMOS technology.

Figure 2:
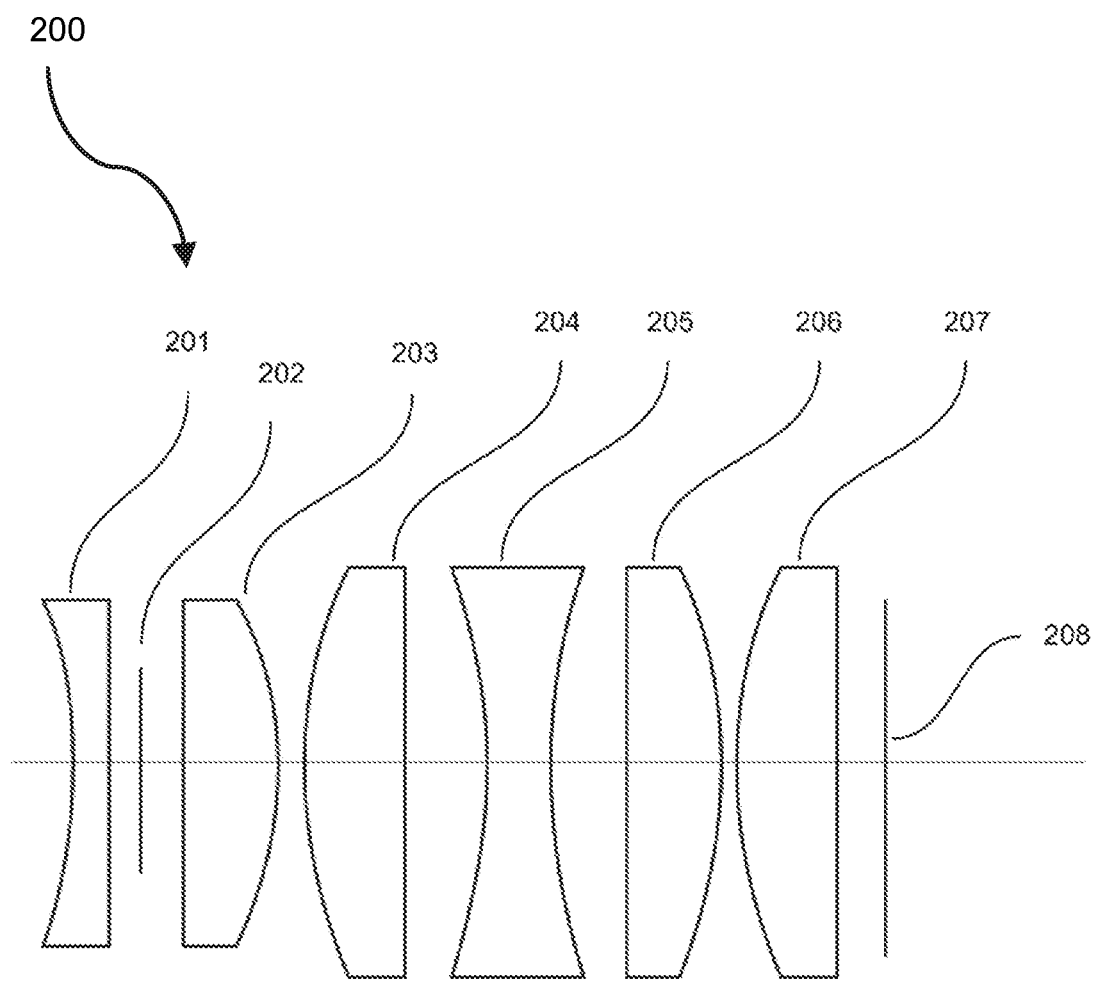
FIG. 2 illustrates an embodiment of a lens system assembly optimised to produce an object-side wide angle and image-side telecentric projection of the captured scene, while allowing for a compact and lightweight design.

FIG. 2 further details the lens assembly 103 of FIG. 1, which is an imaging objective, in accordance with at least one preferred embodiment of the invention. The lens assembly 200 comprises a plurality of components for intended manipulation of rays of electromagnetic radiation within the target range of spectrum. The lens assembly 200 for computational hyperspectral imaging spectroscopy provides compact and lightweight design, as well as large field of view of an object to be captured. The imaging components includes singlet lens elements arranged from the object side to the image side, including a plano-concave element 201, a fixed or variable-diameter aperture 202, a first plano-convex element 203, a second plano-convex element 204, a biconcave element 204, a third plano-convex element 206, a fourth plano-convex element 207, and an image plane 208 that further comprises by a spectral nanofilter array and a photosensitive pixel array (both not shown in FIG. 2).

Figure 3:
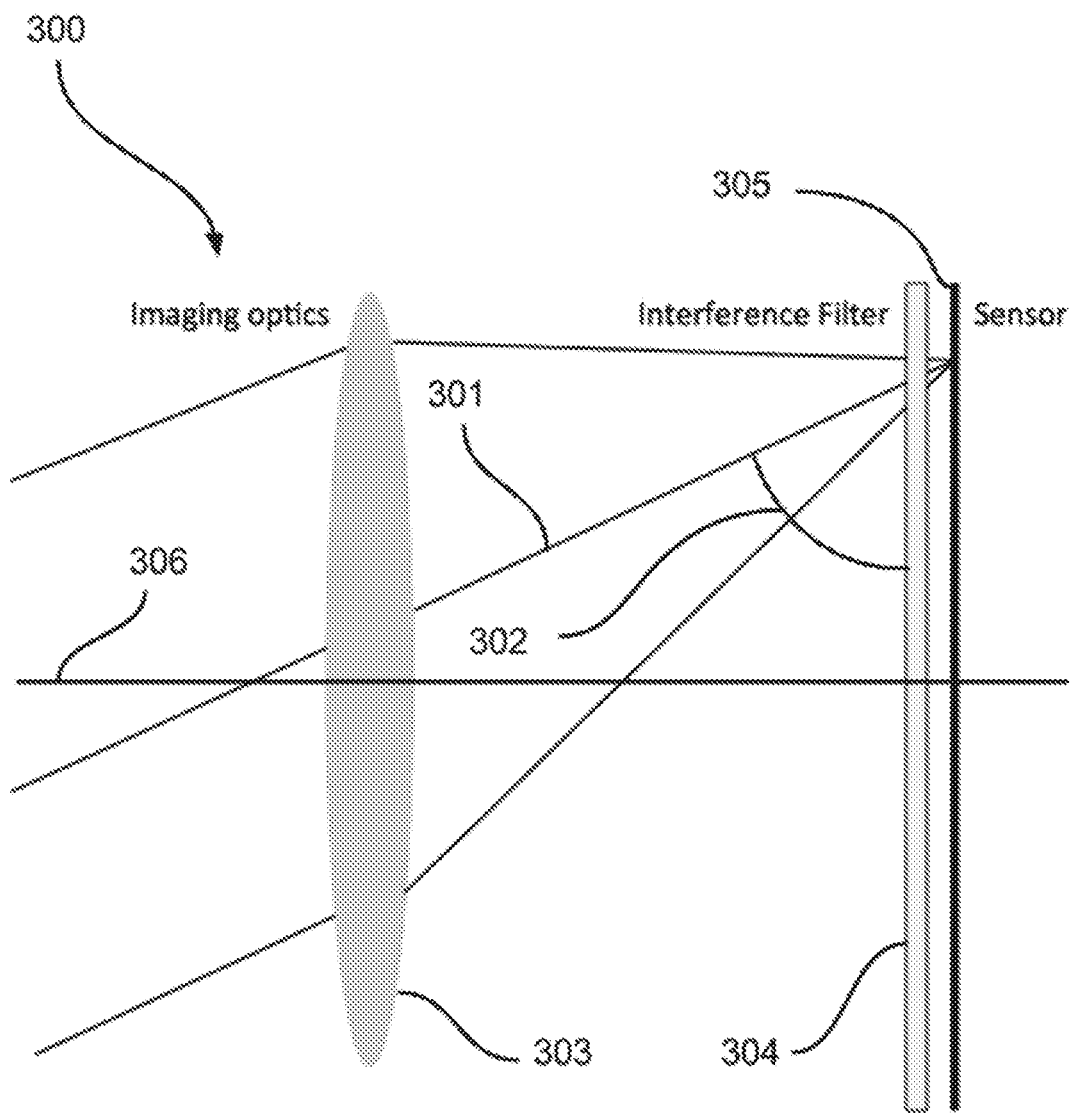
FIG. 3 illustrates an imaging system, whereupon the chief ray angle increases with the increasing distance of the imaged object from the optical axes.

The hyperspectral imaging system 100 of FIG. 1 is further detailed in FIG. 3. It mitigates the potential performance degradation of a nanofilter array 304 when used in conjunction with standard lens systems available on the market. Namely the undesirable red-shift of the central passband wavelength, which occurs for pixels further away from an optical axis 306 of the nanofilter array 304 as chief rays 301 and corresponding incident angles 302 deviate from the perpendicular to the plane of the nanofilter array 304 and a sensor plane (305).

Figure 4:
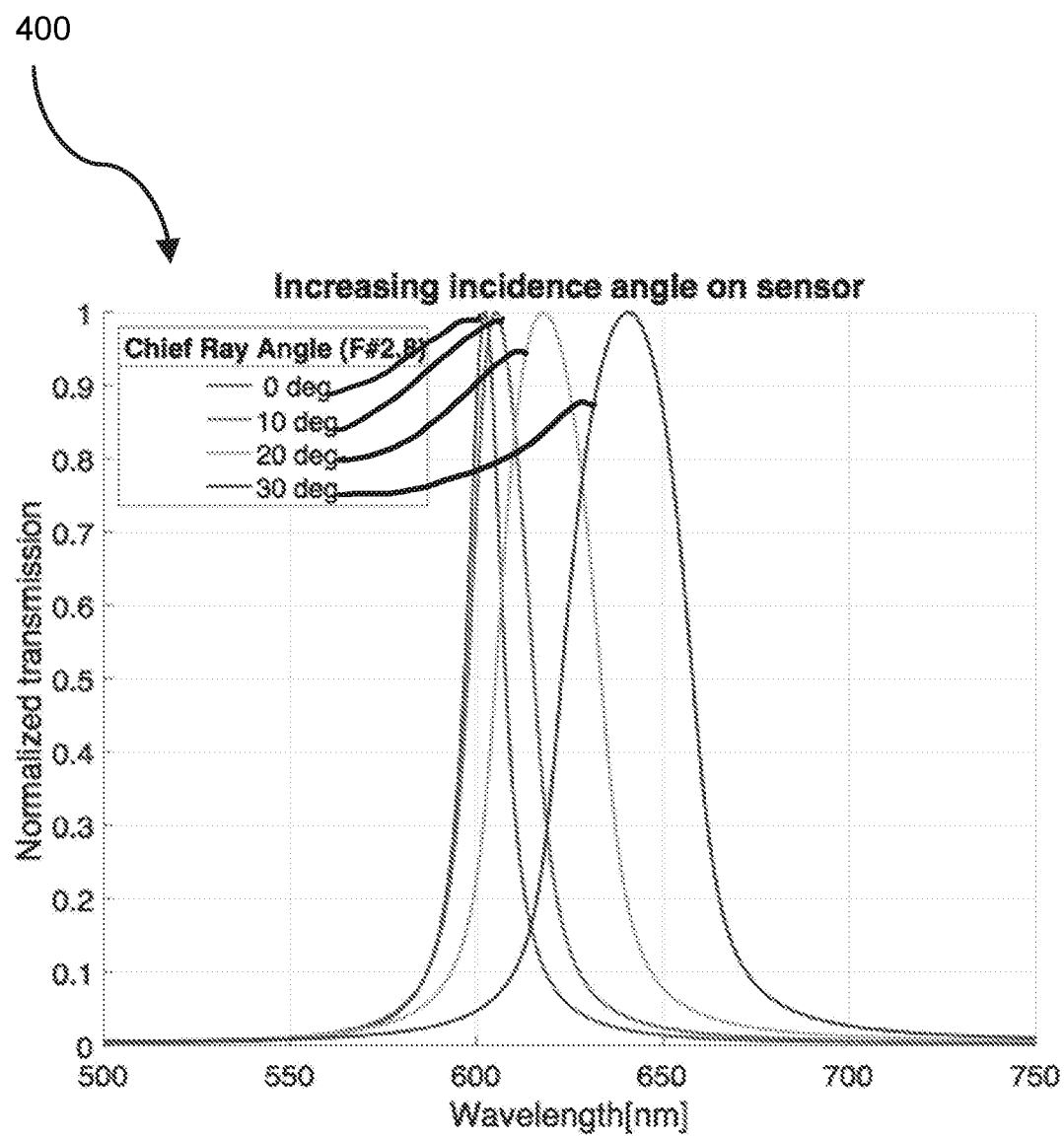
FIG. 4 is a graphical representation of effects of increased chief ray angle, in accordance with at least one embodiment.

Furthermore FIG. 4 is a graphical representation 400 of the red-shift effect for increasing an incidence angle 302 on the nanofilter array 304 shown in FIG. 3, in accordance with at least one preferred embodiment of the invention. FIG. 4 is explained in conjunction with elements from FIG. 3.

Figure 5:
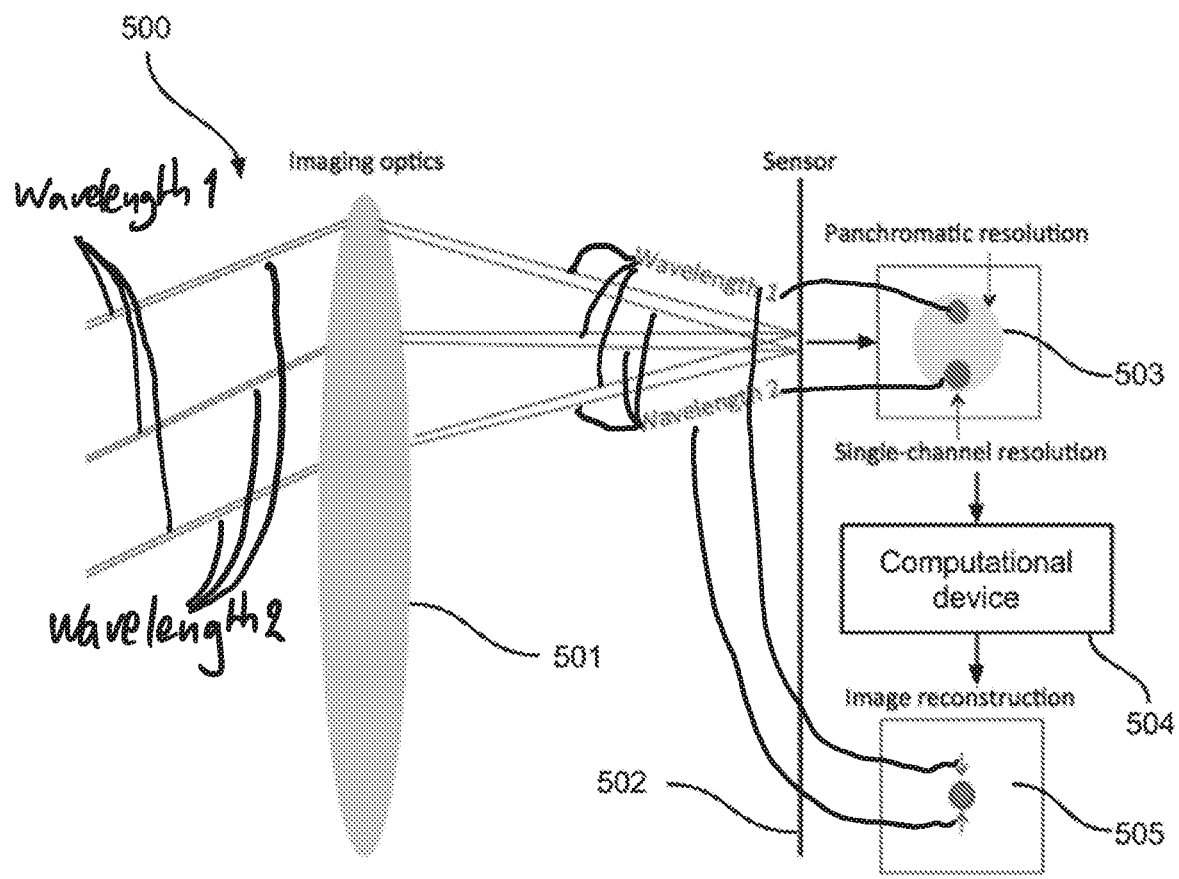
FIG. 5 illustrates an embodiment of the hyperspectral imaging system whereupon the lens assembly may correct for longitudinal, but not the lateral chromatic aberrations and further achieve the image-space telecentricity.

FIG. 5 illustrates the property of a lens assembly 501 of a hyperspectral imaging system 500 whereupon the lens assembly 501 may correct for longitudinal, but not the lateral chromatic aberrations and further achieve the image-space telecentricity. A resultant chromatic aberration 503 observed on the surface on an imaging pixel array 502 may then be corrected by a computational device 504 resulting in the complete hyperspectral cube and the spectral properties of the imaged object in every pixel of the obtained image.

The aforementioned arrangement provides various advantages such as providing results in high speed, compact solution, cost-effective, simplified design, direct integration of "partial scene", providing spectral images by integrating multiple narrow snapshot pictures and then provides easier reconstruction of final image even if scene movement not perfectly translational (e.g., UAV applications).

Additionally, the computational hyperspectral imaging system 100 (see FIG. 1) enables a real-time hyperspectral imaging at video-rates. Further, all the spectral bands integrated in parallel high transmission efficiency. In an exemplary embodiment, the sensor 106 may be implemented using CCD, or CMOS technologies and further capable of receiving light signals across a variety of spectral bands, including but not limited to ultra-violet, visible, near-infrared, mid-wave infrared, short-wave infrared and thermal infrared.

Thus, the present computational hyperspectral imaging system 100 provides a lens system for a multispectral or a hyperspectral camera with integrated spectral filters overlaid on the sensor pixels. Further the present computational hyperspectral imaging system 100 simultaneously captures all spectral information corresponding to each spatial pixel. The present computational hyperspectral imaging system further provides high throughput for maximal sensitivity with low spectral distortion. Hence the present system provides a compact imaging lens system with a short focal length and wide aperture.

No language in the specification should be construed as indicating any non-claimed element as essential to the practice of the invention.

While the present invention has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

The various applications of the present hyperspectral imaging system 100 at least comprises medical imaging, precision agriculture and remote sensing, life-science instrumentation, microscopy & endoscopy, sorting, machine vision, art work scanning, colour measurements, print quality control, blood analysis, chemical analysis, security and surveillance, cosmetics, textile industry, and mineral sorting.

REFERENCES

US 2010201782 A1: Wide angle optical system and image pickup apparatus using the same;

U.S. Pat. No. 9,418,193 B2: Arrayed imaging systems having improved alignment and associated methods;

U.S. Pat. No. 8,563,913 B2: Imaging systems having ray corrector, and associated methods;

U.S. Pat. No. 6,552,788 B1: Hyperspectral imaging using linear chromatic aberration;

US 2014293062 A1: Hyperspectral Camera and Method for Acquiring Hyperspectral Data;

U.S. Pat. No. 7,196,855 B2: Image-capturing lens, image-capturing device and image capturing unit;

US 20140185134 A1: Infrared Lens Unit, Image Capture Module, And Image Capture Device;

US 20090326383 A1: Systems and methods for hyperspectral imaging;

WO 2013116316 A1: Hyperspectral imaging systems, units, and methods;

US 20150177429 A1: Single-sensor hyperspectral imaging device;

WO 2016012980 A1: Compact multifunctional system for imaging spectroscopy.

The invention claimed is:

1. An imaging system for computational imaging spectroscopy of light reflected from an object to be captured, the imaging system configured to provide a large field of view of an object, the system comprising:
an imaging subsystem configured to capture a plurality of rays of light reflected by an imaged object, the imaging subsystem comprising, a lens assembly configured to provide a wide-angle of view and configured to provide an image-side telecentricity such that chief rays of the plurality of rays of light are incident perpendicular to an image plane, at an expense of a correction for lateral and longitudinal chromatic aberrations;

a spectral nanofilter array; and a light sensitive imaging sensor array having the imaging plane; and a computational device to reconstruct a spectral cube from data output from the light sensitive imaging sensor array.

2. The system according to claim 1, wherein the lens assembly comprises a plurality of elements, the plurality of elements including at least one of the list consisting of a plano-concave singlet element;

a plano-convex singlet element;

a biconcave singlet element; and an aperture stop, wherein the aperture stop includes at least one from the list comprising a fixed aperture and a variable-diameter aperture.

3. The imaging system according to claim 1, wherein the lens assembly is configured to produce a plurality of distortion patterns for each wavelength within the spectral range of interest, wherein the spectral nanofilter array is configured to produce a plurality of spatio-spectral samples; and wherein the imaging sensor array is configured to record the plurality of spatio-spectral samples so that data of the spatio-spectral samples are stored in a data storage device.

4. The imaging system according to claim 1, wherein the computational device further is configured to reconstruct the spectral cube of an imaged scene from a plurality of spatio-spectral samples of an imaged scene recorded by the imaging sensor.

5. The imaging system according to claim 1, wherein the light sensitive imaging sensor array includes a charge-coupled device (CCD) or complementary metal-oxide-semiconductor (CMOS) device.

6. The imaging system according to claim 1, wherein the spectral nanofilter array includes a fixed pattern of frequency-selective filters or a tunable pattern of frequency-selective filters.

7. The imaging system according to claim 1, wherein the spectral nanofilter array includes a frequency-selective filter, the frequency-selective filter organized in a gradient pattern, a periodic pattern, or a aperiodic pattern.

8. The imaging system according to claim 1, wherein the lens assembly includes a plano-concave element, a fixed or variable-diameter aperture, a first plano-convex element, a second plano-convex element, a biconcave element, a third plano-convex element, and a fourth plano-convex element.

9. The imaging system according to claim 1, wherein the lens assembly is configured to correct longitudinal chromatic aberrations, but not the lateral chromatic aberrations.

* * * * *